(12) United States Patent
Wan et al.

(10) Patent No.: US 9,425,894 B2
(45) Date of Patent: Aug. 23, 2016

(54) IN-BAND OPTICAL SIGNAL-TO-NOISE RATIO MEASUREMENT

(75) Inventors: Ping W. Wan, Ottawa (CA); Derrick Remedios, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 1404 days.

(21) Appl. No.: 12/916,028

(22) Filed: Oct. 29, 2010

(65) Prior Publication Data

US 2012/0106951 A1   May 3, 2012

(51) Int. Cl.
*H04B 10/08* (2006.01)
*H04B 10/077* (2013.01)
*H04B 10/079* (2013.01)

(52) U.S. Cl.
CPC ...... *H04B 10/0775* (2013.01); *H04B 10/07953* (2013.01)

(58) Field of Classification Search
None
See application file for complete search history.

(56) References Cited

U.S. PATENT DOCUMENTS

| | | | |
|---|---|---|---|
| 5,903,554 A * | 5/1999 | Saints | 370/342 |
| 6,912,359 B2 * | 6/2005 | Blumenthal et al. | 398/29 |
| 7,054,556 B2 * | 5/2006 | Wan et al. | 398/32 |
| 2004/0156632 A1 * | 8/2004 | Lee et al. | 398/26 |
| 2005/0249505 A1 * | 11/2005 | Manderscheid et al. | 398/177 |

OTHER PUBLICATIONS

Audet et al. "The ROADM Challenge and the In-Band OSNR Solution." 2007 EXFO Electra-Optical Engineering Inc., pp. 1-4.
Audet at al. "In-Band OSNR Measurement: Which Method Should You Choose?" http://www.exia.com/en/Library/WaveReview-WRArticle.aspx?Id=123, pp. 1-4.

* cited by examiner

*Primary Examiner* — Li Liu
(74) *Attorney, Agent, or Firm* — Kramer & Amado, P.C.

(57) ABSTRACT

Various embodiments relate to an in-band measurement of the optical signal-to-noise ratio (OSNR) of an optical signal in an optically-amplified transmission system. A demodulation device may tap a transmission fiber to receive an optical signal containing a low-frequency signal. A filter may implement first and second passbands to filter portions of an optical channel in the optical signal. Once the filtered channel is converted to first and second target electrical signals, a measurement circuit may take measurements of DC and AC components for each of the target electrical signals. Based on measurements of the two target electrical signals, the demodulation device may calculate the OSNR as a function of the DC and AC components, or as a function of the adjustment factors between first and second passbands of the optical channel represented by the first and second target electrical signals.

21 Claims, 7 Drawing Sheets

(PRIOR ART)

IN-BAND OPTICAL SIGNAL-TO-NOISE RATIO MEASUREMENT

TECHNICAL FIELD

Various exemplary embodiments disclosed herein relate generally to optical transmission systems and performance measurement.

BACKGROUND

Figure 1:
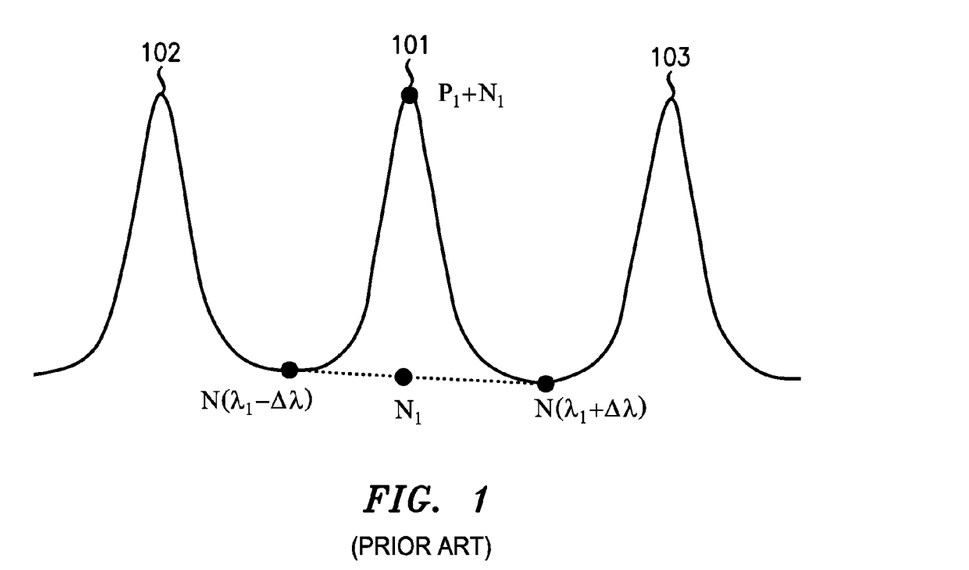
FIG. 1 illustrates a prior art exemplary definition of an optical signal-to-noise ratio (OSNR)

Optical signal-to-noise ratio (OSNR) is an important parameter of performance in optical transmission systems, as it suggests a degree of impairment when an optical signal is carried by an optical transmission system that employs optical amplifiers. FIG. 1 illustrates the IEC 61280-2-9 standard definition of an OSNR 101, which defines OSNR as the average between a left OSNR 102 and a right OSNR 103, each defined as the difference in power between the peak power and the noise at half the distance between the peaks.

Figure 2:
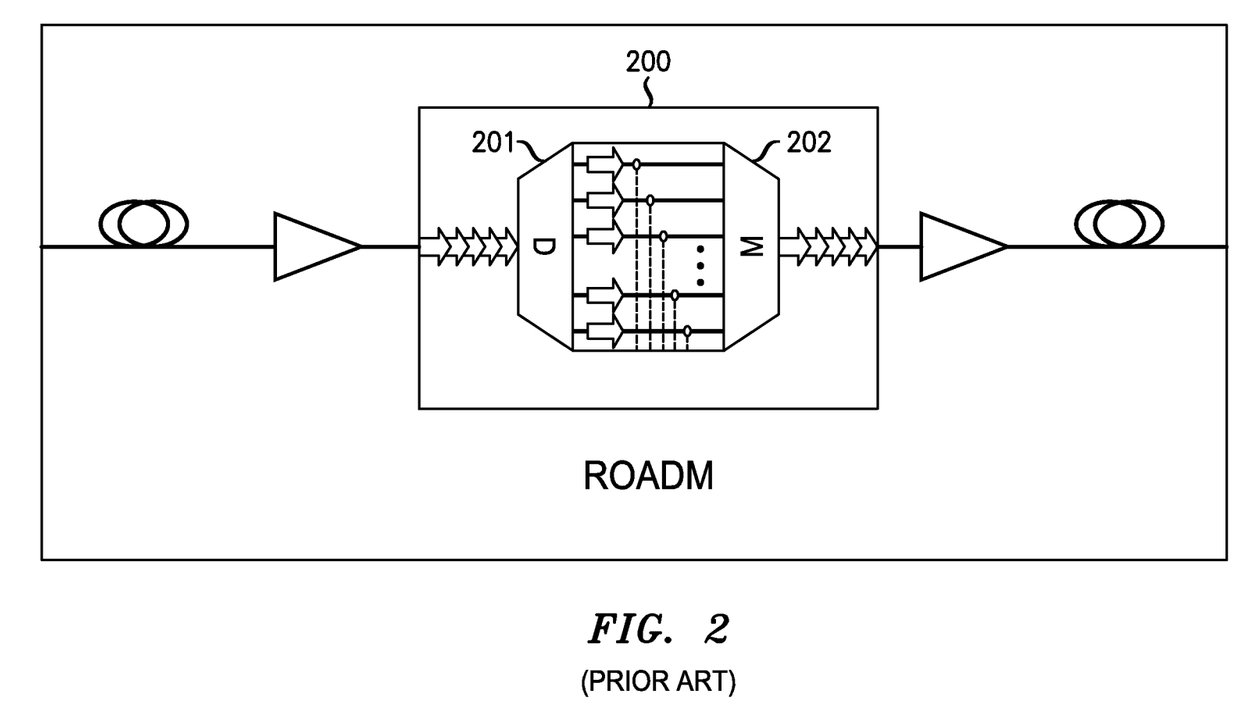
FIG. 2 illustrates a prior art exemplary reconfigurable optical add/drop multiplexer (ROADM)

FIG. 2 illustrates an exemplary device that handles optical signals. Reconfigurable optical add/drop multiplexer (ROADM) 200 includes two arrayed wavelength gratings (AWGs) 201-202 to separate the multiplexed signals in the transmission fiber. In other embodiments, ROADM 200 may include a wavelength selective switch (WSS) to fulfill a similar purpose. ROADM 200 in regular operation may filter out inter-channel amplified spontaneous emission (ASE). As a result, an out-of-band measurement of the OSNR may not truly reflect the actual ASE noise power in the channel. In addition, the bandwidth of the optical signal may almost be as large as the channel filter bandwidth, which may lead to a smooth transition between the noise and the signal. Such smooth transitions may lead to out-of-band OSNR measurements being inaccurate due to the need to have clear separation between the carrier signals.

Figure 3:
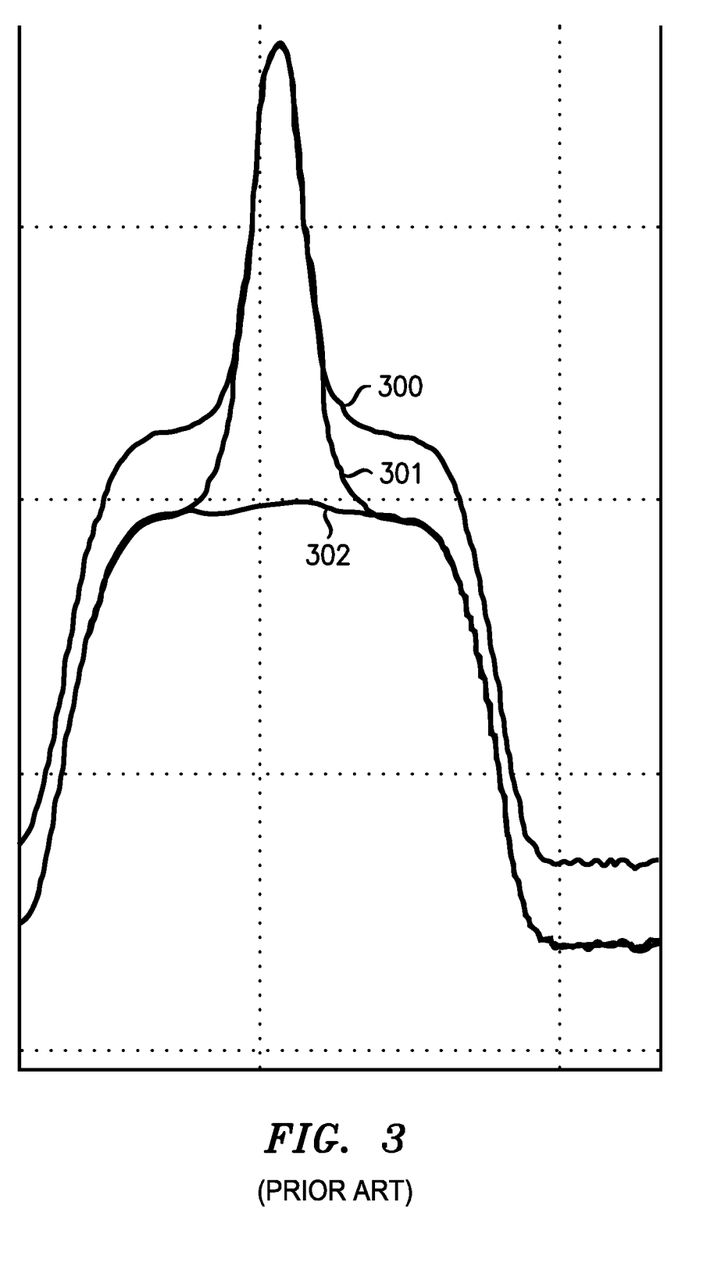
FIG. 3 illustrates a prior art in-band OSNR measurement technique for a highly-polarized optical signal with one polarization.

FIG. 3 illustrates an in-band technique for OSNR measurement, which may be commonly known as "polarization splitting." Optical signal 300 may contain signal component 301 and a noise component 302. Such an in-band measurement requires the transmitted optical signal 301 to be highly polarized and the ASE noise signal 302 to be randomly polarized. This in-band measurement technique also requires the optical signal to contain only one polarization and that there be a large separation between the optical signal 301 and the ASE noise signal 302 (e.g., at least 10 dB). In such a method, a polarization controller and a polarization splitter are used, as the polarization controller may be used to adjust the polarization of the signal so that all of its power will exit the polarization splitter at one port. As the ASE noise may be randomly polarized (regardless of the state of the polarization controller), approximately half of the ASE noise may exit at one port, while the remaining portion may exit at the other port. However, some devices that use dense wavelength division multiplexing (DWDM) may contain multiple signals, each of which possess a different state of polarization. As a result, this in-band measurement technique might be very time consuming.

SUMMARY

Provided are embodiments that enable accurate OSNR measurement. In particular, various embodiments enable accurate OSNR measurement for dual-polarization optical signals.

A brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in the later sections.

Various embodiments relate to a method for in-band measurement of an optical signal-to-noise ratio (OSNR) by a demodulation device. The method may comprise receiving an optical payload containing a low-frequency signal. The method may also comprise filtering a first passband of the optical payload in an optical channel. The method may also comprise converting the first passband-filtered optical signal to a first target electrical signal. The method may also comprise measuring DC and AC components of the first target electrical signal.

Various embodiments of the method may also comprise filtering a second passband of the optical channel within a bandwidth of the optical channel. The method may also comprise converting the second passband-filtered optical signal to a second target electrical signal. The method may also comprise measuring DC and AC components of the second target electrical signal. The method may also comprise determining the OSNR of the optical channel, wherein the OSNR of the optical channel is based on a ratio between the DC and AC components of the first and second target electrical signals.

Various embodiments may also relate to a demodulation device for in-band measurement of an optical signal-to-noise ratio (OSNR). The device may comprise a filter for receiving an optical payload containing a low-frequency signal. The filter may filter a first passband of the optical payload in an optical channel and filter a second passband of the optical payload in the channel. The device may also comprise a converter for converting the first passband-filtered optical signal to a first target electrical signal and a second passband-filtered signal to a second target electrical signal. The device may also comprise a measurement circuit configured to measure DC and AC components of the first and second target electrical signals and determine the OSNR of the optical channel, wherein the OSNR of the optical channel is based on a ratio between the DC and AC components of the first and second target electrical signals.

It should be apparent that, in this manner, various exemplary embodiments enable accurate in-band ONSR measurement. Particularly, by measuring the optical payload at different passbands, the demodulator device may obtain accurate measurements of the ONSR based on the relative power levels at different passbands in the optical payload.

BRIEF DESCRIPTION OF THE DRAWINGS

In order to better understand various exemplary embodiments, reference is made to the accompanying drawings wherein.

DETAILED DESCRIPTION

Referring now to the drawings, in which like numerals refer to like components or steps, there are disclosed broad aspects of various exemplary embodiments.

Figure 4:
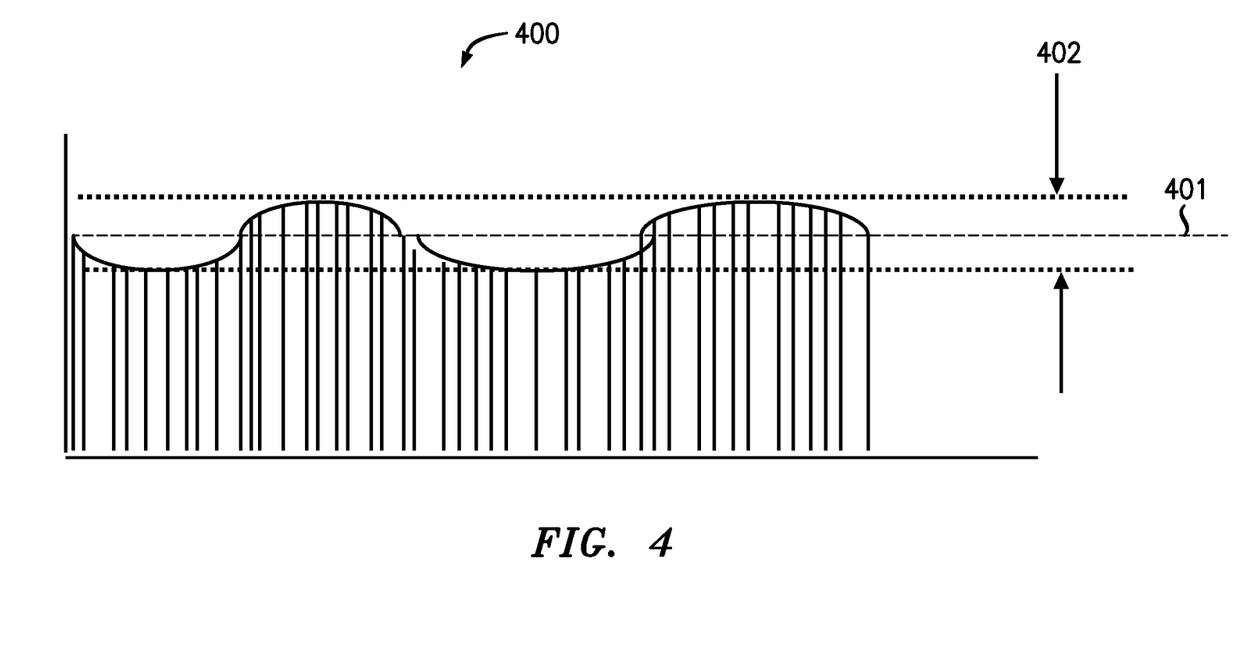
FIG. 4 illustrates an exemplary optical payload with a sub-modulation signal.

FIG. 4 illustrates an exemplary optical payload with a sub-modulation signal. Optical payload 400 may contain an average power signal 401 and a stable, low-frequency signal, such as a sub-modulation signal 402. In the illustrative embodiment, for example, the optical payload 400 may contain an average power signal 401 that may be a DC power signal with a changing sub-modulation signal 402 that may include, for example, a stable AC power signal in the form of A sin wt. In some embodiments, the low-frequency signal may comprise two or more frequency tones. For example, in a network in which optical signals are modulated at high bit rates of 2.5 Gb/s, the low-frequency may comprise one or more frequency tones of approximately 10-100 kHz. The amplitude of the sub-modulation signal 402 may maintain a constant ratio with the average power signal 401. For example, the amplitude of the sub-modulation signal 402 may maintain a 4% ratio with the average power signal 401.

Optical payload 400 may be a result of an optical source, such as a laser source, being modulated with data. In some embodiments, a transmission fiber may carry a Dense Wavelength Division Multiplexing (DWDM) signal that contains multiple optical payloads 400 that are separated into a plurality of optical channels. In some instances, a demodulation device may receive the DWDM signal from the optical source without being modified by another device in the network; for example, the demodulation device may receive the DWDM signal that includes the optical payload 400 directly from the optical source through an optical transmission line. In such instances, the optical payload 400 may already contain a sub-modulation signal or a low-frequency signal that is already stable.

Alternatively, a modulation device may change one channel of the optical payload 400 after being created and/or modified by the optical source. In some embodiments, a system may be implemented so that multiple optical channels are modulated. This may include, for example, multiple modulation devices changing multiple channels.

In some embodiments, a feedback system may also be included in the transmission system to maintain a constant ratio between the sub-modulation signal and the optical mean power. For example, an exemplary feedback system for the modulation device (not shown) may tap the optical transmission line to receive an optical channel of the DWDM signal modified by the modulation device. The feedback system may then filter the optical channel and convert the filtered optical channel into an electrical signal using a P-I-N detector. The feedback system may then feed the electrical signal to a plurality of electrical filters and/or amplifiers, which may prepare one or more modified electrical signals for an analog-to-digital converter (ADC). The ADC may convert the modified electrical signals into one or more associated digital signals that are provided to a microprocessor. In some embodiments, the microprocessor may feed the digital signals to a digital-to-analog converter (DAC) and an amplifier, the output of which is provided to another input of the modulation device. In some embodiments, the digital signals produced by the ADC may be used by the microprocessor as feedback for various components of the modified electrical signal, which may then be used as feedback for the modulation device. For example, a high-pass filter (HPF) and the ADC may be used to produce a feedback signal controlling the sub-modulation signal. In such instances, the HPF and the ADC may then be used to maintain a constant ratio between the sub-modulation signal and the optical mean power.

Figure 5:
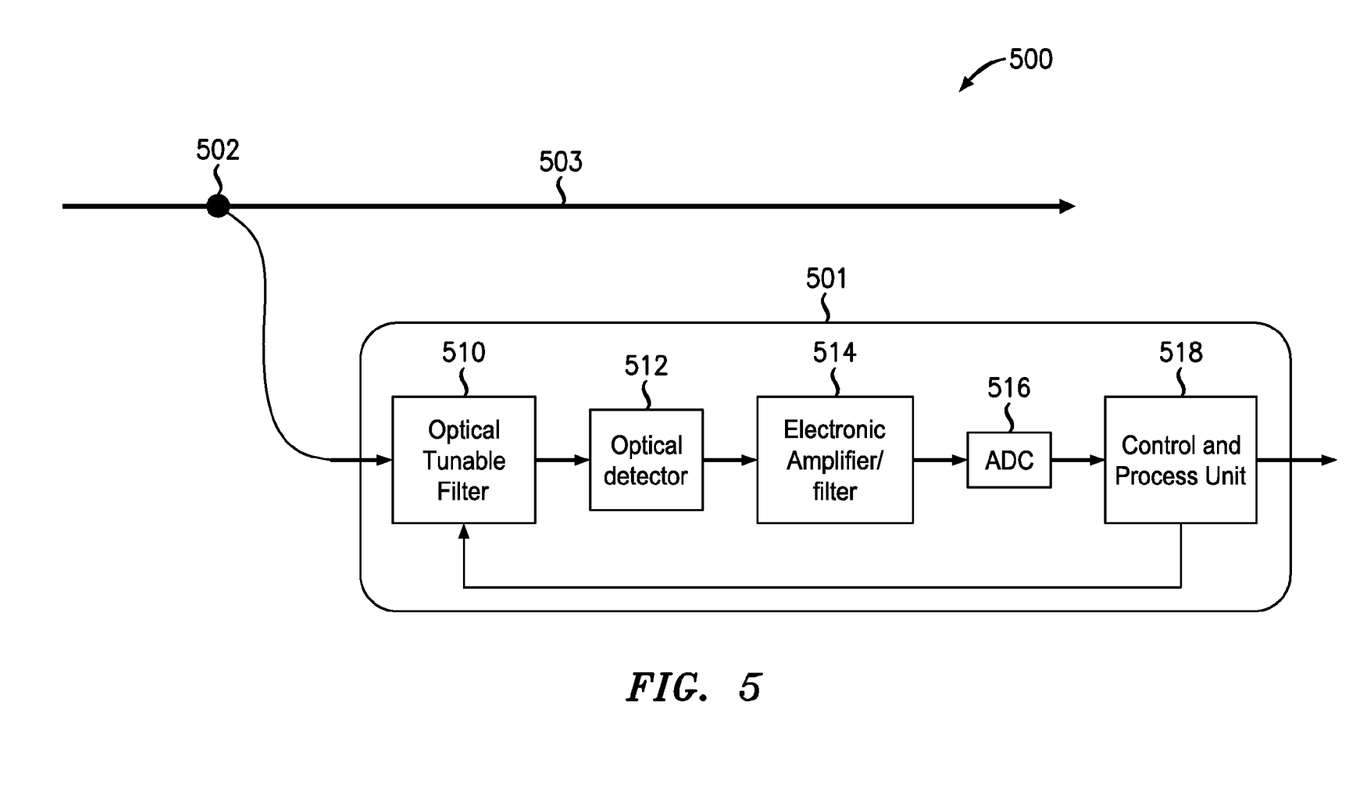
FIG. 5 illustrates an exemplary demodulation device for in-band OSNR measurement.

FIG. 5 illustrates an exemplary demodulation device for in-band OSNR measurement. Demodulation device system 500 may be used at any point in an optical transmission network after the optical payload 400 of FIG. 4 is created or modified to include a sub-modulation signal 402. Demodulation device system 500 may include a demodulation device 501, an optical tap 502, and an optical transmission fiber 503. The demodulation device 501 may include an optical tunable filter 510, an optical detector 512, an electronic amplifier and/or filter 514, an analog-to-digital converter (ADC) 516, and a control and process unit (CPU) 518.

Optical transmission fiber 503 may carry and transmit the optical signal, such as a DWDM signal that includes the optical payload 400. Demodulating device 501 may make an optical tap 502 of the optical transmission fiber 503 in order to receive a portion of the optical signal. The portion received by the demodulation device 501 through the optical tap 502 may be a proportional percentage of the total optical signal. For example, the demodulation device 501 may receive a sample optical payload 400 that is approximately 5% of the total optical signal. In alternative embodiments, the demodulating device 501 may receive more substantial portions of the optical signal, up to and including the entire (i.e., 100%) optical signal.

Optical tunable filter 510 in the demodulation device 501 may receive the sample optical signal produced by the optical tap 502 and may filter various portions of the sample optical signal. In some embodiments, the optical tunable filter 510 may include at least one filter that passes through only one target channel of a plurality of channels included in the sample optical signal. In some embodiments, the optical tunable filter 510 may also include a tunable passband filter that may pass through a segment of the target channel of the sample optical signal. In such instances, the tunable passband filter included in the optical tunable filter 510 may be controlled by the CPU 518. Demodulation device 501 may tune the passband filter multiple times when the demodulation device 501 is making an OSNR measurement.

Optical detector 512 may receive the portion of the sample optical signal outputted from the optical tunable filter 510 and may convert the portion of the sample optical signal into a target electrical signal. Optical detector 512 may be, for example, a P-I-N detector that may receive the portion of the same optical signal as a series of photons and may produce an electrical signal based on the photons received. Optical detector 512 may comprise, for example, a photodiode whose detection range includes the target's optical signal. Optical detector 512 may then produce an electrical current based at least on the received target optical signal.

Electronic amplifier and/or filter 514 may include at least one gain amplifier or filter that receives a target electrical signal from the optical detector 512 and modifies the target electrical signal before the demodulation device 501 makes measurements to determine the OSNR of the optical channel. In some embodiments, the electronic amplifier and/or filter 514 may include a plurality of electronic filters and/or amplifiers that may modify the target electrical signal. For example, the electronic amplifier/filter stage 514 may comprise an automatic gain-controlled (AGC) amplifier in series with a high-pass filter (HPF) or low-pass filter (LPF) that may filter the target electrical signal.

In some embodiments, the demodulation device 501 may measure the target electrical signal between the electronic amplifier and/or filter stage 514 and the ADC stage 516. As will be discussed below in relation to FIGS. 6A-6F and 7, the demodulation device may make measurements of various components of the target electrical signal in order to calculate the OSNR from those measurements. Such measurements may include, for example, the AC and DC voltages of the target electrical signal over time. Demodulation device 501 may make similar measurements at multiple times, as the optical tunable filter 510 may be tuned to different passbands.

Analog-to-Digital Converter (ADC) 516 may receive the modified target electrical signal from the electronic amplifier/filter stage 514 and may convert the modified target electrical signal into a digital signal. In some embodiments, the digital signal produced by the ADC 516 may be used by the CPU 518 to, for example, adjust the optical tunable filter 510 or electrical amplifier/filter stage 514.

Control and process unit (CPU) 518 may receive the digital signal produced by the ADC 516 and may control the settings of the optical tunable filter 510 and/or the electronic amplifier/filter stage 514. In some embodiments, the CPU 518 may make adjustments on the optical tunable filter 510 and the amplifier/filter stage 514 based on the received digital signal, enabling a feedback system within the demodulation device 501 based on the tapped DWDM signal. In some embodiments, the CPU 518 may adjust the passband of the optical tunable filter 510 independent of the digital signal. This may occur, for example, in order to enable the demodulation device 501 to make an ONSR calculation based on multiple measurements of the targeted optical channel.

FIGS. 6A-6F illustrate an exemplary in-band OSNR measurement technique for the signal spectrum. Demodulation device 501 may employ the technique used in FIGS. 6A-6F when measuring and calculating the OSNR of a target optical channel. In some embodiments, the CPU 518 may calculate the OSNR based on various measurements on the modified electrical signal at the input of the ADC 516. In some embodiments the CPU 518 may include a measurement circuit that may be configured to measure components of electrical signals in order to determine the OSNR.

Figure 6A:
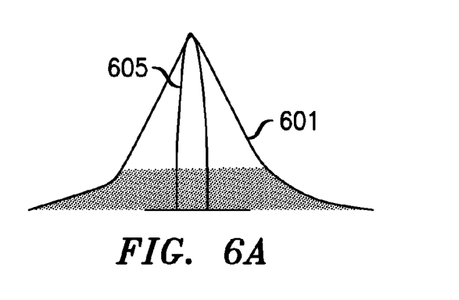
FIGS. 6A-6F illustrates an exemplary in-band OSNR measurement technique for the optical payload.

FIG. 6A illustrates a first measurement taken by the demodulation device 501. CPU 518 may, for example, control the optical tunable filter 510 to a first passband 605 of the target optical channel 601. In some embodiments, a controller may be included within the optical tunable filter 510. In alternative embodiments, the CPU 518 may include a controller that may, for example, set the passband filter around the "center" of the target optical channel 601. In such instances, the "center" of the target optical channel 601 may include the channel's peak power. As a result, when the demodulation device 501 subsequently measures the voltage of the resultant target electrical signal at the input of the ADC 516, the voltage may be:

$$V_{ADC\text{-}DC1} = V_{Sig\text{-}DC} + V_{ASE}$$

Where $V_{ADC\text{-}DC1}$ is the measured DC voltage of the target electrical signal when the filter is in its first passband 605. In some embodiments, the measured DC voltage may be equal to the average voltage of the target electrical signal. The measured DC voltage $V_{ADC\text{-}DC1}$ may be the sum of the DC voltage of the signal, $V_{Sig\text{-}DC}$, and the voltage of the ASE noise, $V_{ASE}$.

Figure 6B:
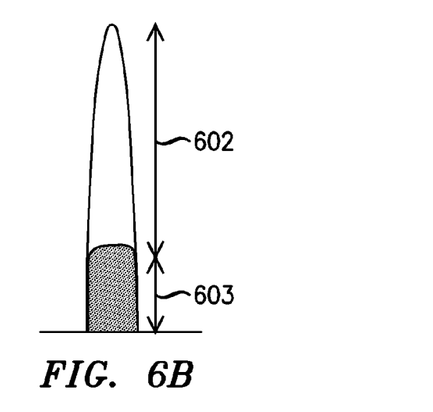
Figure 6C:
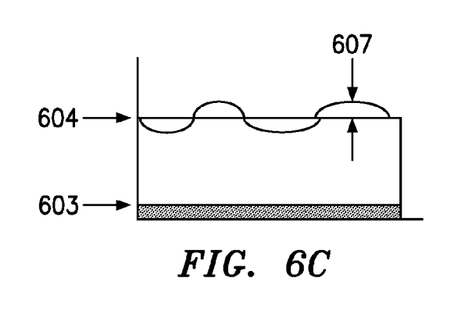

FIG. 6B illustrates the components of the target optical signal selected by the optical tunable filter 510 for the first passband 605. The components may comprise a signal portion 602 and an Amplified Spontaneous Emission (ASE) noise portion 603. Demodulation device 501 may attempt to measure the ratio between the signal and the noise by measuring various component values for the target optical signal 601. FIG. 6C illustrates the target optical signal 601 as captured from the first passband 605. Average power signal 604 may be the average power of the selected optical signal as passed through the first passband 605. Its value equals:

$$V_{ADC\text{-}DC1} = V_{Sig\text{-}DC} + V_{ASE}$$

This value may be equal to the sum of the signal mean and the ASE noise mean without any sub-modulation signal 607. Accordingly, the value of the line 603 remains as the voltage of the noise, $V_{ASE}$, while the sub-modulation signal 607 has a voltage equal to the AC component, $V_{Sig\text{-}AC}$.

Figure 6D:
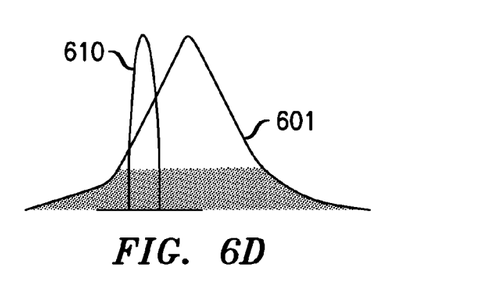
Figure 6E:
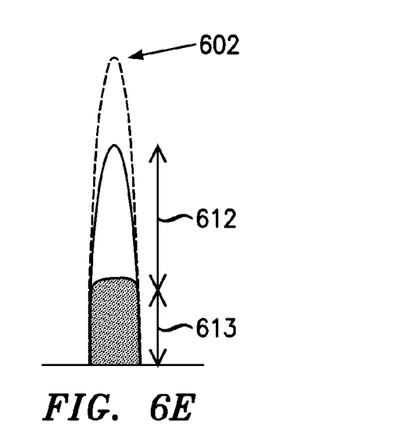
Figure 6F:
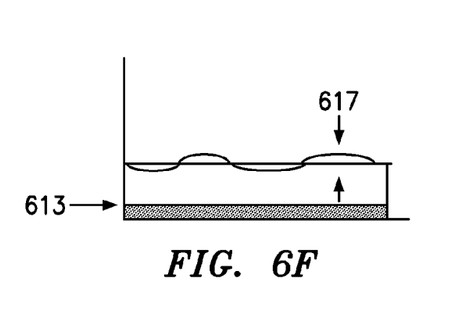

FIGS. 6D-6F illustrate another portion of the target optical channel when measured at a second passband 610. CPU 518 may reposition the optical tunable filter 510 to a second passband 610 after the demodulation device 501 made measurements at the first passband 605. In some embodiments, the CPU 518 may control the optical tunable filter 510 to a second passband 610, where the CPU 518 chooses the second passband 610 based on the relative power of the optical channel. For example, in the illustrative embodiment, the second passband 610 may be positioned where the power of the target optical channel is at least 10% below peak power.

In other embodiments, the CPU 518 may choose the second passband 610 based on the location of the first passband 605; for example, the CPU 518 may move the optical tunable filter 510 to center around a second passband 610, where the second passband 610 is at a defined distance away from the first passband 605. For example, in a 50 GHz Grid system, the tuning may have a maximum distance of 25 GHz. In such instances, the CPU 518 may use a defined distance of 15 GHz when tuning to subsequent passbands. While FIGS. 6A-6F illustrate the demodulation device 501 making a measurement where the first passband 605 is centered around the peak power of the optical signal, alternative embodiments may have the demodulation device 501 position the passband filter of the optical tunable filter 510 to passbands that are not at peak power. Similarly, in some alternative embodiments, the second passband 610 may have a higher power than the first passband 605.

FIG. 6E illustrates the target optical channel at the second passband 610. In the illustrative embodiment, the ASE noise signal 613 may maintain a similar value to the noise measurement at the first passband 605, where $V_{ASE1} \approx V_{ASE2}$. However, the total optical signal 612 may be measurably less than the total optical signal 602 of the target optical signal at the first passband 605, where the voltage measured at the input of the ADC 516 equals:

$$V_{ADC\text{-}DC2} = V_{Sig\text{-}DC} * R + V_{ASE}$$

Where $V_{ADC\text{-}DC2}$ is the measured DC voltage of the electrical signal at the second passband 610. In this equation, R is equal to a reduction value. In the illustrative embodiment, R may be a value between 0 and 1, due to the rolloff characteristics of the payload spectrum as shown in FIG. 6A. In alternative embodiments, R may be greater than 1. This may occur, for example, when the measured power in the second passband 610 is higher than the measured power in the first passband 605.

FIG. 6F illustrates the target optical signal as captured by the passband filter. In the illustrative embodiment, the target optical signal 601 may include the portion of the tapped optical channel that passed through the second passband 610. In such instances, the sub-modulation signal 617 may also be attenuated by the same reduction value R, while the ASE noise signal 613 may remain constant.

CPU 518 may use the measured values for the target electrical signal at both the first passband 605 and the second passband 610 to calculate the OSNR of the optical signal. As:

$$V_{ADC-DC1} = V_{Sig-DC} + V_{ASE}$$

$$V_{ADC-DC2} = V_{Sig-DC} * R + V_{ASE}$$

Subtracting these equations from each other may produce:

$$V_{ADC-DC1} - V_{ADC-DC2} = (1-R)V_{Sig-DC}$$

Similarly, the voltage of the sub-modulation signals 607, 617 may be expressed as:

$$V_{ADC-AC1} = V_{Sig-AC} \text{ and}$$

$$V_{ADC-AC2} = V_{Sig-AC} * R$$

Where $V_{ADC-AC1}$ and $V_{ADC-AC2}$ may be measured as AC voltages at the first passband 605 and the second passband 610, respectively. Dividing the two previous equations may then produce:

$$V_{ADC-AC2}/V_{ADC-AC1} = \frac{V_{Sig-AC} * R}{V_{Sig-AC}} = R$$

Using these equations, the ratio of signal power to in-band ASE noise power, $P_{sig}/P_{ASE}$, may be expressed as the ratio of voltages $V_{sig-DC}/V_{ASE}$, where:

$$\frac{V_{Sig-DC}}{V_{ASE}} = \frac{(V_{ADC-DC1} - V_{ADC-DC2})V_{ADC-AC1}}{V_{ADC-DC2} * V_{ADC-AC1} - V_{ADC-DC1} * V_{ADC-AC2}}$$

The power ratio may be simplified to:

$$P_{Sig}/P_{ASE} = \frac{1 - R_{DC}}{R_{DC} - R_{AC}}$$

Where $R_{DC}$ and $R_{AC}$ are the ratios of the DC voltages and the AC voltages at the second and first passbands, respectively. This ratio of $P_{sig}/P_{ASE}$ may be a quantity that compares the signal power to the in-band ASE noise power, where $P_{sig}$ is the signal power within the passband of the optical filter 510 and $P_{ASE}$ is the ASE noise power within the passband of the optical filter 510, respectively. Knowledge of the passband and the format of the optical payload 400 may then be used to determine the optical power with the optical payload spectrum 601. Similarly, knowledge of the bandwidth of the passband may also be used to determine the ASE noise power within a 0.1 nm bandwidth. As the target electrical signal is related to the optical signal, the OSNR may be determined based on the power ratio. For example, knowledge of the bandwidth of the passband and the format of the optical payload 400 may be used to determine the OSNR of the optical payload 400 from the measurements of the associated electrical signal.

Figure 7:
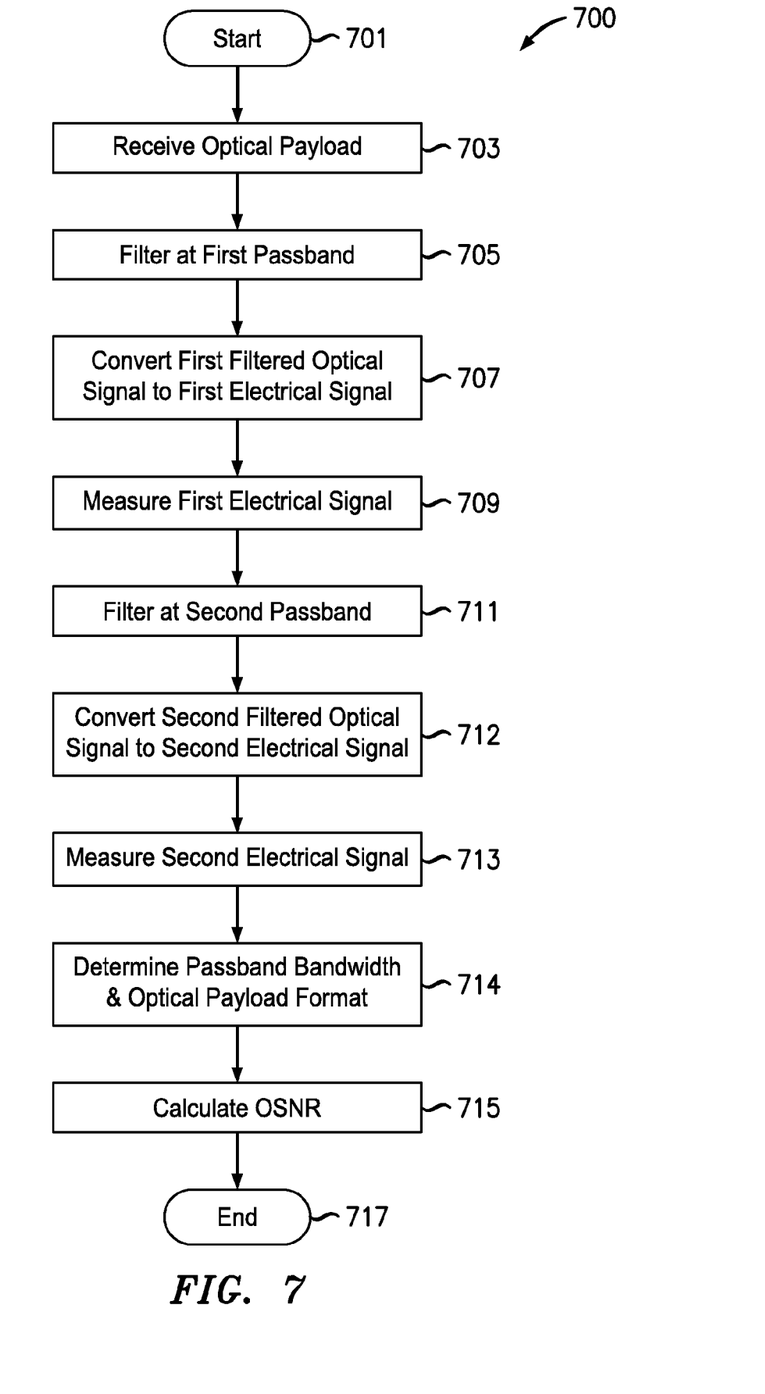
FIG. 7 illustrates an exemplary flowchart for measuring OSNR using an optical tunable filter.

FIG. 7 illustrates an exemplary flowchart for measuring OSNR using the optical tunable filter 510. Demodulation device 501 may employ method 700 at any point upon tapping the optical transmission fiber 503 to measure the OSNR of an optical channel. Method 700 may be similar to steps illustrated in FIGS. 6A-6F, where the demodulation device may use the CPU 518 to tune a passband filter in the optical tunable filter 510 to different portions of the target optical channel 601 in order to make measurements to calculate the ONSR.

Method 700 begins at step 701 and proceeds to step 703, where the demodulation device 501 receives the optical signal. In some embodiments, the optical tunable filter 510 of the demodulation device 501 may receive the optical signal. In some embodiments, the optical tunable filter 510 may receive a tapped optical signal from the optical tap 502 located on the optical transmission fiber 503.

Demodulation device 501 may then proceed to step 705, where the passband filter within the optical tunable filter 510 is set to a first passband 605. In some embodiments, the CPU 518 may control the tuning of the passband filter of the optical tunable filter 510. In some embodiments, the passband filter may be tuned to a first passband 605 in which the passband filter is centered on the tapped optical payload at peak power. For example, the CPU 518 may tune the passband filter of the optical tunable filter 510 around the center of the tapped optical payload spectrum 601.

In step 707, the demodulation device may convert the received optical payload into an electrical signal. In some embodiments, the demodulation device 501 may use an optical detector 512, such as a P-I-N detector to detect optical levels of the optical signal transmitted from the optical tunable filter 510 and convert these optical levels into a related electrical signal. In some embodiments, the optical signal transmitted from the optical tunable filter 510 may only include portions that passed through the passband filter.

In step 709, the demodulation device 501 may measure the electrical signal. In some embodiments, the demodulation device 501 may use a measurement circuit included in the CPU 518 to measure the electrical signal after traversing through both the optical detector 512 and an amplifier/filter stage 514. In some embodiments, the demodulation device 501 may measure the electrical signal immediately after being produced by the optical detector 512. Demodulation device may measure multiple components of the electrical signal over time, such as the voltage of the electrical signal over a defined period. From this voltage measurement, the demodulation device may separate the voltage into separate DC and AC voltages, which may represent the average power signal and sub-modulation signal, respectively. In some embodiments, the measured DC voltage may include both the voltage of the signal and the voltage of the noise in the tapped optical signal. In some embodiments, the CPU 518 may make the measurements of the components in the electrical signal. In some embodiments, the CPU 518 may store the measured values and related calculated values in a system memory.

Demodulation device 501 may then proceed to step 711, where the passband filter may be detuned to a second passband 610. In some embodiments, the passband filter may maintain the same characteristics as for the first passband 605, such as, for example, maintaining the same bandwidth. In some embodiments, the CPU 518 may control the tuning of the passband filter of the optical tunable filter 510 so that it is centered on a different location after measuring an electrical signal associated with the first passband 605. In some embodiments, the CPU 518 may detune the passband filter of the optical tunable filter 510 so that it is centered on a location that has a power that has a defined difference from the peak power. For example, the CPU 518 may detune the passband filter so that it is centered on a second passband 610 that is 10% below the peak power of the first passband 605. In alternative embodiments, the CPU 518 may detune the passband filter to a defined distance away from the first passband 605. In step 712, the demodulation device may convert the second filtered optical signal to a second electrical signal, in a similar manner to that of step 707.

In step 713, the demodulation device 501 may measure a second electrical signal. The second measured electrical signal may be produced from the tapped optical payload transmitted from the optical tunable filter 510 at the second passband 610. The measured components of the second electrical signal may also be separated into DC and AC components, where the differing values from the DC and AC components in the first measurement may be a function of reduction values $R_{DC}$ and $R_{AC}$, respectively. In some embodiments, the demodulation device 501 may tune the passband filter to other passbands and may make subsequent measurements at each new passband.

In step 714, the bandwidth of the passband filter may be determined. In some embodiments, the CPU 518 may save the value of the bandwidth of the passband filter when setting the passband filter in the first passband 605 and the second passband 610. In alternative embodiments, the CPU 518 may determine the bandwidth after making the measurements at the first passband 605 and the second passband 610. In some embodiments, the format of the optical payload spectrum 601 may be based, for example, on known information in the optical transmission system. In some embodiments, the passband bandwidth and the optical payload spectrum format may be used by the demodulation device 501 to determine the total OSNR from the measured electrical signals in the first passband 605 and the second passband 610.

Demodulation device 501 may then proceed to step 715, where it determines the OSNR of the tapped optical channel. In some embodiments, the CPU 518 of the demodulation device 501 may determine the OSNR of the tapped optical channel based on the measurements of the first and the second electrical signals in steps 709 and 713. From these measurements, the CPU 518 may, for example, determine the OSNR of the tapped optical channel as being equivalent to the voltage ratio of the signal and the ASE noise. In such instances, the CPU 518 may determine the signal voltage 602, 612 as a function of the DC and the AC voltages of the first and the second electrical signals. In some embodiments, the CPU 518 may determine the DC and the AC voltages based on subsequent measurements made when the passband filter is tuned to additional passbands. CPU 518 may similarly determine the voltage of the ASE noise 603, 613 as a function of the DC and the AC voltages of the first and the second electrical signals.

In some embodiments, the CPU 518 may determine the ONSR by dividing the calculated signal voltage 602, 612 by the calculated ASE noise voltage 603, 613. In such instances, the ONSR may be a function of the DC and the AC voltages of the first and the second electrical signals. CPU 518 may also determine the ONSR as a function of the reduction values of the DC and the AC voltages between the first and the second electrical signals. In some embodiments, the CPU 518 may use the passband bandwidth and the optical payload spectrum format determined in step 714 to determine the OSNR from the first and the second electrical signals measured in the first passband 605 and the second passband 610. After calculating the ONSR from the measured values of the first and the second electrical signals, method 700 may end at step 717.

It should be apparent from the foregoing description that various exemplary embodiments of the invention may be implemented in hardware and/or firmware. Furthermore, various exemplary embodiments may be implemented as instructions stored on a tangible machine-readable storage medium, which may be read and executed by at least one processor to perform the operations described in detail herein. A tangible machine-readable storage medium may include any mechanism for storing information in a form readable by a tangible machine, such as a personal or laptop computer, a server, or other computing device. Thus, a tangible machine-readable storage medium may include a read-only memory (ROM), a random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

We claim:

1. A method for in-band measurement of an optical signal-to-noise ratio (OSNR) by a demodulation device, the method comprising:
   receiving an optical payload containing a low-frequency signal;
   filtering a first passband of the optical payload in an optical channel;
   converting the first passband-filtered optical signal to a first target electrical signal;
   measuring DC and AC components of the first target electrical signal;
   filtering a second passband of the optical payload within a bandwidth of the optical channel;
   converting the second passband-filtered optical signal to a second target electrical signal;
   measuring DC and AC components of the second target electrical signal; and
   determining the OSNR of the optical channel, wherein the OSNR of the optical channel is based on a first ratio between the DC components of the first and second target electrical signals and a second ration between the AC components of the first and second target electrical signals.

2. The method of claim 1, wherein the first ratio is represented by $R_{DC}$, the second ratio is represented by $R_{AC}$, and the OSNR is based on a relationship:

$$\frac{1 - R_{DC}}{R_{DC} - R_{AC}}.$$

3. The method of claim 2, wherein the DC component of the second target electrical signal is equal to the DC component of the first target electrical signal reduced by a factor of $R_{DC}$, where $R_{DC}$ is an adjustment factor with a value less than 1.

4. The method of claim 2, wherein the DC component of the second target electrical signal is equal to the DC component of the first target electrical signal raised by a factor of $R_{DC}$, where $R_{DC}$ is an adjustment factor with a value greater than 1.

5. The method of claim 1, wherein the low-frequency signal comprises one or more frequency tones.

6. The method of claim 1, wherein filtering the first passband and filtering the second passband are implemented by an optical tunable filter.

7. The method of claim 1, wherein a modulation device generates the low-frequency signal and adds the low-frequency signal to the optical payload.

8. The method of claim 1, wherein the second passband is located a shifted distance away from the first passband, wherein the shifted distance is within the bandwidth of the optical channel.

9. The method of claim 1, wherein the received optical payload is a portion of a tapped optical signal that is less than 20% of an optical signal in a network transmission fiber.

10. The method of claim 1, wherein the second passband is located where the second target electrical signal's power has at least a 10% difference from the first target electrical signal's power.

11. A demodulation device for in-band measurement of an optical signal-to-noise ratio (OSNR), the device comprising:
a filter for receiving an optical payload containing a low-frequency signal, filtering a first passband of the optical payload in the optical channel, and filtering a second passband of the optical payload in the optical channel;
a converter for converting the first passband-filtered optical signal to a first target electrical signal and a second passband-filtered signal to a second target electrical signal; and
a measurement circuit configured to measure DC and AC components of the first and second target electrical signals, and determine the OSNR of the optical channel, wherein the OSNR of the optical channel is based on a first ratio between the DC components of the first and second target electrical signals and a second ratio between the AC components of the first and second target electrical signals.

12. The demodulation device of claim 11, wherein the first ratio is represented by $R_{DC}$, the second ratio is represented by $R_{AC}$, and the OSNR is based on a relationship:

$$\frac{1 - R_{DC}}{R_{DC} - R_{AC}}.$$

13. The demodulation device of claim 12, wherein the DC component of the second target electrical signal is equal to the DC component of the first target electrical signal reduced by a factor of $R_{DC}$, where $R_{DC}$ is an adjustment factor on the DC voltage with a value less than 1.

14. The demodulation device of claim 12, wherein the DC component of the second target electrical signal is equal to the DC component of the first target electrical signal raised by a factor of $R_{DC}$, where $R_{DC}$ is an adjustment factor on the DC voltage with a value greater than 1.

15. The demodulation device of claim 11, wherein the low-frequency signal comprises one or more frequency tones.

16. The demodulation device of claim 11, wherein the filter comprises an optical tunable filter for tuning a tunable passband to at least the first passband or the second passband.

17. The demodulation device of claim 16, further comprising:
a controller for tuning the tunable passband of the optical tunable filter, wherein the controller is configured to: set the tunable passband as the first passband, and retune the tunable passband to that of the second passband within the bandwidth of the optical channel.

18. The demodulation device of claim 17, further comprising:
an analog-to-digital converter (ADC) for converting the first and second target electrical signals from analog signals to digital signals before transmission to the controller.

19. The demodulation device of claim 11, wherein a modulation device generates the low-frequency signal and adds the low-frequency signal to the optical payload.

20. The demodulation device of claim 11, wherein the second passband is located a shifted distance away from the first passband, wherein the shifted distance is within the bandwidth of the optical channel.

21. The demodulation device of claim 11, wherein the second passband is located where the second target electrical signal's power has at least a 10% difference from the first target electrical signal's power.

* * * * *